(12) United States Patent
Daga et al.

(10) Patent No.: US 9,767,034 B2
(45) Date of Patent: Sep. 19, 2017

(54) OPERATING A FIFO MEMORY

(71) Applicant: EM MICROELECTRONIC-MARIN SA, Marin (CH)

(72) Inventors: Jean-Michel Daga, Aix-en-Provence (FR); Alexandre Deschildre, Marin (CH)

(73) Assignee: EM MICROELECTRONIC-MARIN SA, Marin (CH)

( * ) Notice: Subject to any disclaimer, the term of this patent is extended or adjusted under 35 U.S.C. 154(b) by 117 days.

(21) Appl. No.: 14/708,787

(22) Filed: May 11, 2015

(65) Prior Publication Data
US 2015/0331805 A1    Nov. 19, 2015

(30) Foreign Application Priority Data
May 16, 2014  (EP) .................................... 14168676

(51) Int. Cl.
| | |
|---|---|
| G06F 12/08 | (2016.01) |
| G06F 12/0891 | (2016.01) |
| G06F 5/06 | (2006.01) |
| G06F 5/12 | (2006.01) |

(52) U.S. Cl.
CPC ............ *G06F 12/0891* (2013.01); *G06F 5/06* (2013.01); *G06F 5/12* (2013.01); *G06F 2212/1028* (2013.01); *G06F 2212/1044* (2013.01); *G06F 2212/45* (2013.01); *G06F 2212/69* (2013.01)

(58) Field of Classification Search
CPC .......... G06F 12/0891; G06F 5/06; G06F 5/12; G06F 2212/1044; G06F 2212/1028

USPC .................................................. 711/133, 159
See application file for complete search history.

(56) References Cited

U.S. PATENT DOCUMENTS

| | | | |
|---|---|---|---|
| 5,388,074 A | 2/1995 | Buckenmaier et al. | |
| 6,058,439 A | 5/2000 | Devereux | |
| 6,345,329 B1 | 2/2002 | Baskey et al. | |
| 6,359,238 B1 * | 3/2002 | Ursu ...................... | G01G 19/03 177/1 |
| 7,254,677 B1 | 8/2007 | Lowe et al. | |

(Continued)

FOREIGN PATENT DOCUMENTS

| | | |
|---|---|---|
| EP | 1 772 795 A1 | 4/2007 |
| EP | 2 629 221 A1 | 8/2013 |
| WO | 2010/065295 A1 | 6/2010 |

OTHER PUBLICATIONS

European Search Report for EP 14 16 8676 dated Jan. 19, 2015.

*Primary Examiner* — Pierre-Michel Bataille
(74) *Attorney, Agent, or Firm* — Sughrue Mion, PLLC

(57) ABSTRACT

The present invention concerns a method of operating a first-in first-out memory (9) arranged to store measurement data samples measured by a plurality of data measurement sensors (1, 3, 5), which can operate at various sampling rates. The oldest measurement data sample in the memory (9) is arranged to be read first before the newer measurement data samples. The method comprises: receiving measurement data samples from at least two data measurement sensors (1, 3, 5); and saving the received measurement data samples in the memory (9). Each of the measurement data samples saved in the memory is associated with a tag which is also saved in the memory (9) and which identifies the data measurement sensor (1, 3, 5) which measured the respective measurement data sample.

13 Claims, 3 Drawing Sheets

(56) References Cited

U.S. PATENT DOCUMENTS

| | | | |
|---|---|---|---|
| 8,631,490 B2* | 1/2014 | Wurster | G06F 21/75 345/173 |
| 9,342,154 B2* | 5/2016 | Nasiri | G06F 3/0346 |
| 9,474,475 B1* | 10/2016 | Budiman | A61B 5/14532 |
| 2008/0034170 A1 | 2/2008 | Ohl et al. | |
| 2013/0332682 A1* | 12/2013 | Yavelberg | G06F 12/00 711/154 |
| 2015/0285834 A1* | 10/2015 | Shibuya | G09B 19/0038 702/150 |

* cited by examiner

| | |
|---|---|
| Mag data X | 10 |
| ... | ... |
| Gyro data 2 | 00 |
| Gyro data 1 | 00 |
| Mag data 0 | 10 |
| Acc data 0 | 01 |
| Gyro data 0 | 00 |

Write — 17
9
Read — 19

OPERATING A FIFO MEMORY

This application claims priority from European Patent Application No 14168676.6 of May 16, 2014, the entire disclosure of which is hereby incorporated herein by reference.

TECHNICAL FIELD

The invention relates to the field of first-in first-out (FIFO) memories. More specifically, the present invention relates to a method of operating such memories to store data items in these kinds of memories. The invention also relates to a corresponding FIFO memory, a computer program product and an electronic circuit comprising such a memory.

BACKGROUND OF THE INVENTION

Electronic circuits may have many data sources, such as measurement sensors, obtaining data that need to be saved in a memory, such as a FIFO memory. FIFO memories are typically data buffers or data stacks, in which the oldest data entry is processed or read out first. A data buffer is a physical memory storage used to temporarily store data while it is being moved from one place to another. These electronic circuits also typically comprise means for managing the memory. The measurement sensors may be of different types, such as a gyroscope, an accelerometer, a magnetometer, a pressure sensor and a temperature sensor. The first three mentioned types of sensor may have multiple measurement axes. Such electronic circuits may also include an analog-to-digital (A/D) converter, arranged to convert a continuous physical quantity from any one of the data sources to a digital number that represents the quantity's amplitude. The digital signals can then be stored successively in the memory.

Data from different data sources can be sampled by using different sampling rates. For instance, in an example in which the electronic circuit comprises a gyroscopic sensor with three axes, an accelerometer with three axes, and a magnetometer with three axes, the sampling rates for all these sensors can be different from one another. We can assume a situation in which the gyroscope measurements are sampled with a sampling rate of 2000 samples per second, while the accelerometer and the magnetometer measurements are sampled at rates of 200 and 20 samples per second, respectively. In the known solutions in which data items, entries or samples from multiple data sources are saved in a FIFO memory, data samples from all the data sources are saved in the memory whenever any one of the sensor measurements is sampled. In other words, in the example in which a first data sample Gyro1 is saved from the gyroscope, the first data samples Accel1 and Magn1 respectively from the accelerometer and the magnetometer are also saved. When the second data sample Gyro2 from the gyroscope is saved, then the first data samples Accel1 and Magn1 from the accelerometer and the magnetometer are saved again in the memory. This means that, in this example, for every new saved data sample from the gyroscope, there are 10 repeated, identical data samples saved from the accelerometer and 100 repeated, identical data samples saved from the magnetometer. This solution is of course not optimal, since the FIFO memory space is limited and for this reason it is quickly filled with redundant data. Operating the FIFO memory in this manner would also increase the circuit power consumption unnecessarily.

SUMMARY OF THE INVENTION

It is an object of the present invention to overcome the problems identified above related to the FIFO memories when used to save data from different data sources.

According to a first aspect of the invention, there is provided a method of operating a first-in first-out memory arranged to store measurement data samples measured by a plurality of data measurement sensors, in which memory the oldest measurement data sample is arranged to be read first, the method comprising:
  receiving measurement data samples from at least two data measurement sensors of different type; and
  saving the received measurement data samples in the memory,
  wherein each of the measurement data samples saved in the memory is associated with a tag, also saved in the memory, identifying the data measurement sensor which measured the respective measurement data sample.

The proposed new solution has the advantage that the memory space can be used efficiently and the power consumption can be minimized, since there is no need to save repeated data items from one data source several times. The aspects relating to the dependent claims have further advantages, as will be described below.

According to a second aspect of the invention, there is provided a computer program product comprising instructions for implementing the steps of a method of operating a first-in first-out memory when loaded and run on a micro-controller unit for operating the memory.

Said computer program can be loaded and run on computer means, such as preferably a micro-controller unit (MCU).

According to a third aspect of the invention, there is provided a first-in first-out memory arranged to store measurement data samples measured by a plurality of data measurement sensors, wherein the oldest measurement data sample is arranged to be read first from the memory, the memory comprising means for:
  receiving measurement data samples from at least two data measurement sensors of different type; and
  saving each of the received measurement data samples in the memory,
  wherein the memory comprises means for associating said each measurement data sample with a tag identifying the data measurement sensor which measured the respective measurement data sample, and wherein it comprises means for saving the tag in the memory.

According to a fourth aspect of the invention, there is provided an electronic circuit comprising the memory and further comprising the said measurement sensors connected to a control unit connected to the memory, wherein the control unit is arranged to sample measurement data from the measurement sensors by applying different sampling rates for measurements from different measurement sensors.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which.

DETAILED DESCRIPTION OF EMBODIMENTS OF THE INVENTION

An embodiment of the present invention will now be described in detail with reference to the attached figures. This embodiment describes the operation of the FIFO memory and the related circuit elements. This embodiment will be described in the context of an electronic circuit comprising several measurement sensors as data sources. However, the teachings of the present invention are not limited to the types of measurement sensors described.

Figure 1:
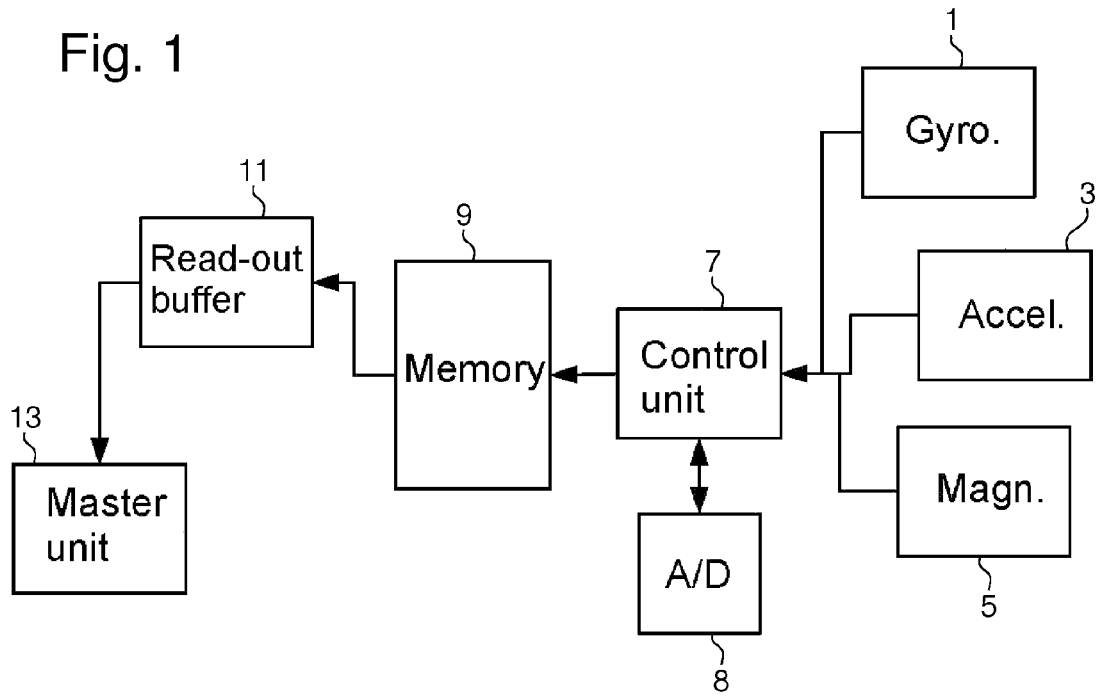
FIG. 1 is a block diagram showing network elements that may be involved in the method of operating the FIFO memory according to an embodiment of the present invention.

FIG. 1 shows in a simplified block diagram an electronic circuit comprising circuit elements that may be involved in the operation of the FIFO memory. The functioning of these elements will be described next in more detail. This kind of electronic circuit can be placed for example in a mobile phone or other portable instrument. In this example the electronic circuit comprises three measurement sensors, namely a gyroscope 1 for measuring orientation, an accelerometer 3 for measuring acceleration and magnetometer 5 for measuring the strength and/or direction of a magnetic field. The circuit may also comprise for example a temperature sensor for temperature measurements and/or a pressure sensor for pressure measurements. According to this example, all the sensors in this circuit are arranged to perform measurements along three different axes that can be orthogonal with respect to each other. The measurement signals from the different sensors are sampled by a control unit 7 that can apply different sampling rates to measurements from different sensors. In this specific example, the output data rates for the gyroscope, accelerometer and the magnetometer are 200 samples/s, 100 samples/s and 100 samples/s respectively. The control unit is arranged to actively interrogate the different sensors to obtain the wanted measurements. Thus, the control unit can easily determine from which sensor different measurements originate, and it can keep track of the source of the relevant measurement samples. Since the measurement signals from the different sensors are analog, these signals are then fed to an A/D converter 8 to convert these analog signals to digital signals. The digital measurement signals from the A/D converter 8 are then sent back to the control unit 7 to be saved in the FIFO memory or buffer 9.

According to the present invention, each time a new measurement data item or sample originating from a measurement sensor becomes available, that digital measurement data sample is stored in a register in the FIFO memory together with an identifier or a tag indicator that is associated with the measurement data. Thus, the data saving of the measurement data samples from the measurements that are sampled with a lower sampling rate than the highest sampling rate in the circuit does not depend on the data-saving frequency of the data samples from the measurements sampled at the highest sampling rate. It is also possible to save some supplementary information received from the sensors. Such supplementary information could be orientation of the device comprising the sensor or shock detection information for example. The tag contains information about the data source of a specific digital measurement data sample. For the electronic circuit that comprises three measurement sensors, namely the gyroscope, the accelerometer and the magnetometer, the tag needs at least 2 bits to define differently each source of data to be stored. By using the tag in this way, only the new measurement data samples are successively stored in the FIFO memory, irrespective of whether they originate from the same or different sensors, which reduces the size of such a FIFO memory, and the power consumption of the electronic circuit is also reduced.

Figure 2:
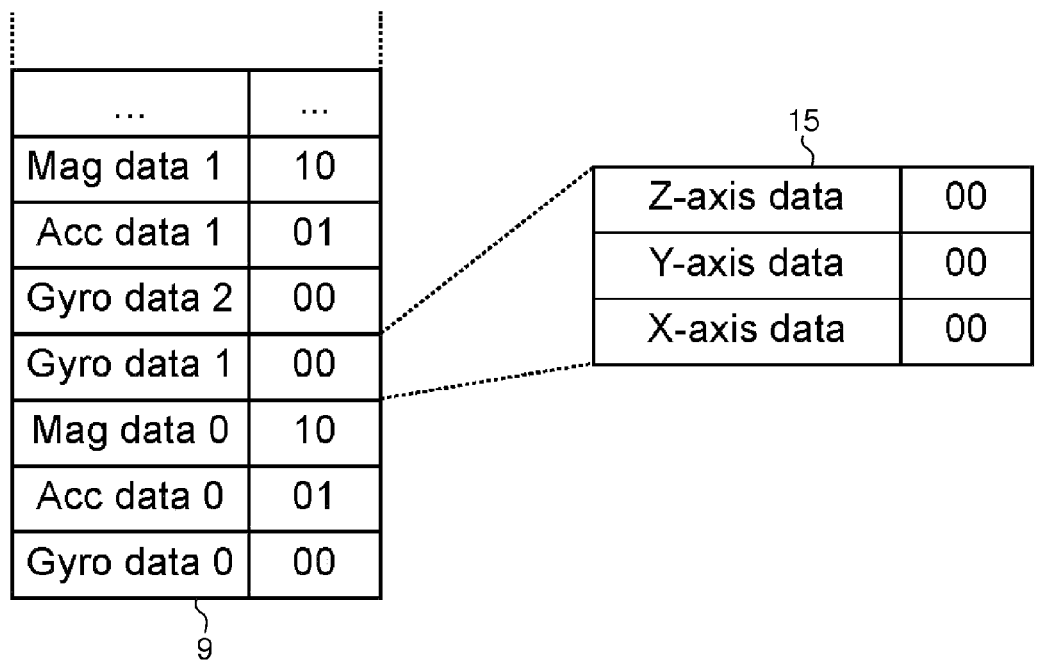
FIG. 2 is a simplified schematic view illustrating some of the content of the data saved in the FIFO memory according to one example of the present invention.

The table of FIG. 2 shows some of the content of the FIFO memory 9 in more detail. The left-hand column shows the content of the measurement data samples, while the right-hand column shows the content of the tags. In this example, the gyroscope has a tag identifier 00, the accelerometer has a tag identifier 01, while the magnetometer has a tag identifier 10. Thus, every data source can be uniquely identified by the tag. As in this example the output data rate of the gyroscope 1 is twice the output data rate of the accelerometer 3 or the magnetometer 5, and the number of the gyroscope measurement data samples in the FIFO memory is twice the number of measurement data samples from the accelerometer or the magnetometer.

One row in the FIFO memory 9 can be considered to be one register in the memory. Thus, one register contains a single data set 15 as shown on the right hand side in FIG. 2. In this example, the data set 15 as shown contains X-axis data, Y-axis data and Z-axis data for the measurement number 1 of the gyroscope together with the relevant tag bits. Each axis data may de defined by 16 bits, for example. Thus, in this example, the size of a single data set is 3×16 bits+3×2 bits=54 bits. Actually, in each data set the tag information needs to be saved only once. Thus, a further optimization may be obtained and the total length of the data set in this case would be 3×16 bits+1×2 bits=50 bits. It is to be noted that in an electronic circuit there may be different sensor data defined by different lengths of data strings. For example, temperature measurements could be defined by 12 bits, whereas the other sensors measurements may be defined by 16 bits for each axis of liberty. In this case, the available register size would be defined according to longest possible measurement data string (in this example 16 bits) multiplied by the numbers of axes, added by the number of bits required by the tag. However, the size of the required data set is increased if any supplementary information is saved in the same register.

Figures 3, 4:
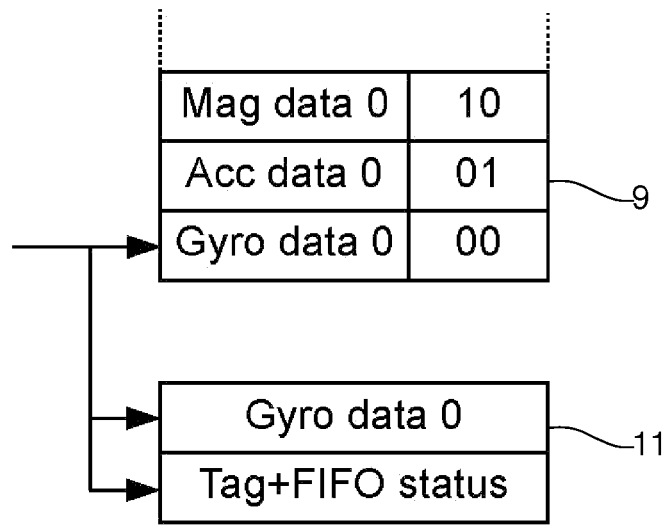
FIG. 3 is a simplified schematic view illustrating some of the content of the FIFO memory and read and write pointers according to one example of the present invention.
FIG. 4 is a simplified schematic view illustrating the content of a read-out buffer according to one first example of the present invention.

According to the present invention, two pointers can be used to address the FIFO memory 9 as shown in FIG. 3. A first pointer 17 is used to write data in a register of the memory 9, whereas a second pointer 19 is used to read information from another register of the memory 9. Each of these pointers may occupy a predetermined register in the memory 9 to give the register address the pointer is pointing at. When information is read from the memory 9, this information is first transferred to a read-out buffer 11, from where it can be read by a master unit 13. The interface between the buffer 11 and the master unit 13 may be for instance a serial interface as will be described later in more detail. By using these two pointers, the control unit 7 always knows where to write data in the memory 9 since that location is unambiguously indicated by the write pointer 17, while the buffer 11 knows where (in which register or memory space) to read the memory 9, since this location is unambiguously indicated by the read pointer 19. Accordingly, in the present invention, there is no need to shift or move any data in the memory 9, in contrast to current FIFO memories. In known FIFO solutions, the new data is always written into the same register or memory space, which means that the data in the register would have to be shifted every time a write operation is completed. In the method of the present invention, the data shifting can be avoided, and the overall number of operations and thereby also the power consumption of the electronic circuit may be reduced.

The pointers can be arranged such that, when a pointer reaches the top of the memory, it will go back to the bottom or alternatively, when a pointer reaches the bottom, it will go back to the top. Normally, the speed of reading the memory 9 is much higher than the speed of writing in it. However, it may happen that the write pointer 17 reaches the read pointer 19. In this case the value of the write pointer 17 and the read pointer 19, indicating the current memory location, is incremented by one and the data in the old read pointer location is overwritten by new data.

It is also possible to introduce a flag to the memory 9 indicating the status of the memory to the other relevant entities. Depending on the amount of possible information that needs to be indicated, the flag may simply be a bit or bit sequence and saved in a predetermined location in the memory 9. Thus, depending on the bit sequence value in this memory location, any third party, such as the master unit 13, can determine the information content of the flag and take the required actions. For example, this flag may be used to indicate that the memory 9 is empty. This flag can be used to indicate that a given threshold has been reached. This threshold may be the number of empty memory spaces in the FIFO memory 9. By operating in this manner, the master unit 13 can be warned or notified that there is a risk that some data will soon be lost unless it starts reading the data again or accelerates the data reading process. Once the write pointer location=read pointer location −1, then it can be determined that the memory 9 is full. This may be also indicated by the flag. On the other hand, if the read pointer 19 reaches the write pointer 17, then it can be determined that all the data in the memory have been read. Also this could be indicated by the flag. Thus, the flag could show to the master 13 that all the data have been read and thus there is no need to continue reading until this piece of information is overruled. It would also be possible to use more than one flag (i.e. more than just one bit or bit sequence) to indicate at least some of the above information.

A further aspect of the present invention relates to the read-out buffer 11 as shown in FIG. 4 for a first example. According to this aspect, the FIFO memory 9 is read by the master unit 13 indirectly through the buffer 11. As mentioned earlier, this interface may be a serial interface, such as a serial peripheral interface (SPI) or inter-integrated circuit ($I^2C$) interface. The content of the memory space to which the read pointer 19 is pointing, i.e. the oldest data item, is automatically loaded into the read-out buffer 11. The content comprises at least the measurement data sample and the tag. Additionally, the FIFO memory status, which may be expressed by the above flag, may also be loaded into the buffer. The supplementary information mentioned earlier may also be loaded into the buffer. In this first example, as shown in FIG. 4, the read-out buffer 11 comprises two memory spaces. A first memory space is used for the actual measurement data, in this example for the X-axis, Y-axis and Z-axis measurement data from the gyroscope. A second memory space is used for the other information including the tag, the FIFO status information and/or the supplementary information. However, it would be also possible to organize the read-out buffer 11 so that it has only one memory space for saving all the needed information, or so that it has more than two memory spaces. Since the serial interfaces typically read data in sets of 8 bits, the 16-bit long information is divided into two blocks of 8 bits. Thus, in the described example, the first memory space of the buffer 11 would contain 3×2×8 bits to cover the gyroscope measurements from three axes. In this example, the second memory space is also 8 bits long so that it can be read through the serial interface.

The master unit 13 is arranged to request the address information from a memory containing the read-out buffer. It is to be noted that this memory is not the same as the FIFO memory 9. Once the master sends the buffer memory address, it can start reading the data from that buffer once a start reading condition is generated by the master unit 13. In other words, an address counter will loop on the read-out buffer 11 until a start/stop condition is generated by the master unit. As the master unit 13 also reads the FIFO status information from the buffer, it can easily detect e.g. when to stop reading the buffer 11 or when it has read all the data items in the FIFO memory 9. In this way, the master unit needs to read data from one address location only, and the data can be read in burst mode with a minimum number of clock pulses. This again means a reduction in the power consumption in the circuit.

Figure 5:
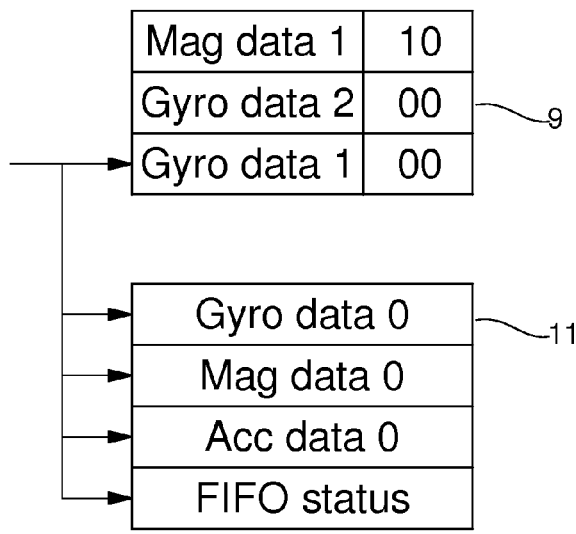
FIG. 5 is a simplified schematic view illustrating the content of a read-out buffer according to one second example of the present invention.

A further aspect of the present invention relates to the read-out buffer 11 as shown in FIG. 5 for a second example. As abovementioned in relation to FIG. 4, the FIFO memory 9 is read by the master unit 13 indirectly through the buffer 11. However a second implementation of the FIFO read-out buffer is described as shown in FIG. 5.

The FIFO read-out buffer 11 is to have a buffer, which contains on a set of registers for each sensor type, i.e. a register for gyroscope measurement Gyro data 0, a register for magnetometer measurement Mag data 0 and a register for accelerometer measurement Acc data 0. By this way, MCU does not need to read out the tag as data coming from the FIFO are automatically stored in the right set of registers, in particular data of Gyro are always stored in the same set of registers. Data in one set are updated if master unit 13 reads the buffer 11 and if the next data pointed by the read pointer 19 correspond to the same sensor type.

For example, the gyroscope has a sampling rate higher than accelerometer or magnetometer. In this case, with described FIFO management, the FIFO will have more samples coming from the gyroscope from other sensors. The most important thing is that the read-out buffer 11 should match this difference of sampling rate in order not to lose the sequence of samples versus time. For this reason, when the master unit 13 will read-out the buffer 11, once it has been completely read, it will be updated with "Gyro data 1", other sensor data will not be updated as next data is "Gyro data 2". It is to be noted that the other sensor data are not updated, given that their sampling rate is lower than sampling rate of gyroscope. So one major difference is that FIFO controller should monitor not only the address pointed by the read pointer 19, but also the two consecutive ones.

If all sensors have the same sampling rate, the FIFO memory will be filled successively by the measurement data from each sensor. Once master unit 13 read the read-out buffer 11, FIFO master should replace set of data of all sensors in the read out buffer 11 as first one is "Gyro data 1", second one is "Acc data 1" and last is "Mag data 1".

Figure 6:
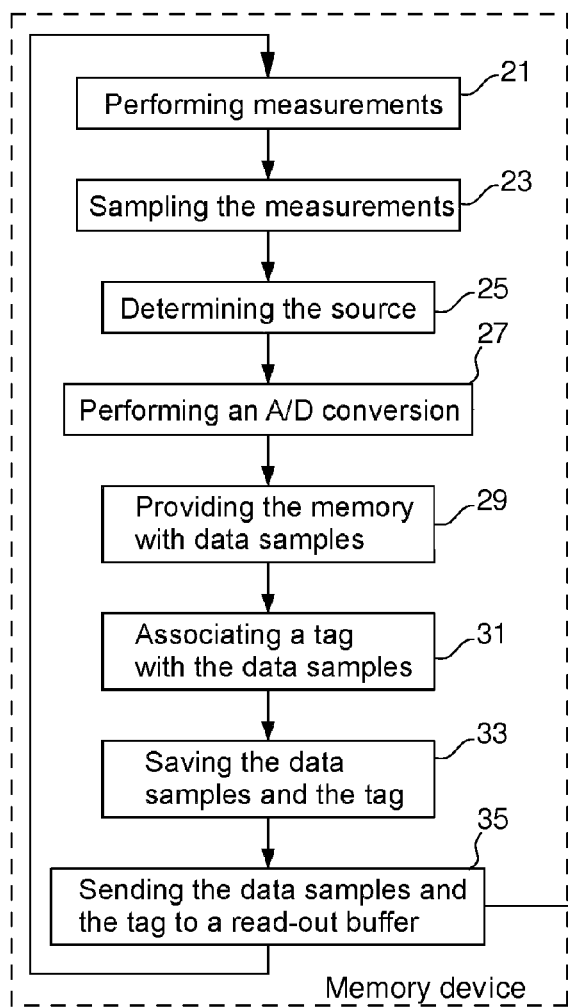
FIG. 6 is a flow chart illustrating the method of operating the FIFO memory according to one simplified example.
Figure 6:
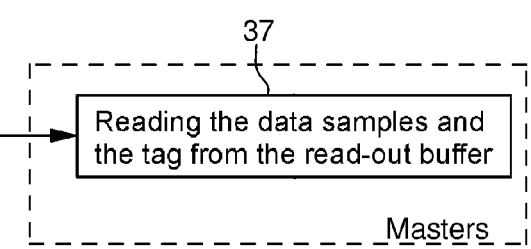

The flow chart of FIG. 6 summarizes some of the steps explained above. In step 21 the measurement sensors perform measurements. In step 23 the control unit 7 samples the analog measurement signals and determines in step 25 also the measurement source for each of the received measurements signals. Then the control unit 7 requests the A/D converter to perform the A/D conversion, which is done in step 27 by that converter. The digital samples are now sent back to the control unit 7 that can now, in step 29, send the measurement data samples to the FIFO memory 9. These samples are sent to the memory together with an indication of their origin. In step 31 the FIFO memory 9 associates the received samples with the tag and in step 33 the FIFO memory 9 saves the samples and the tag. In step 35 the data items, i.e. at least the measurement data samples and the associated tags saved in the memory, are sent to the read-out buffer 11 so that the master unit 13 can read these data items from the read-out buffer in step 37. After the step 35 for the measurement data samples with associated tags sent to the read-out buffer 11, a new measurement is performed in the memory device at step 21. As explained above, the writing and/or reading operations in the memory 9 can be done with the help of the pointers 17, 19. In the illustrated flow chart, some of the steps, e.g. the reading and writing operations, can be done simultaneously.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of operating a first-in first-out (FIFO) memory arranged to store measurement data samples measured by a plurality of data measurement sensors, in which memory an oldest measurement data sample is arranged to be read first, the method comprising:
   sampling first measurement data samples from a first measurement sensor of a first type at a first sampling rate and second measurement samples from a second measurement sensor of a second type at a second sampling rate different from the first sampling rate;
   storing the first measurement data samples in the FIFO memory
   in association with a first tag that identifies the first data measurement sensor based on the sampling of the first measurement data samples at the first sampling rate; and
   storing the second measurement data samples in the FIFO memory in association with a second tag that identifies the second data measurement samples based on the sampling of the second measurement data samples at the second sampling rate.

2. The method according to claim 1, further comprising:
   receiving the first tag from the first measurement sensor; and
   receiving the second tag from the second measurement sensor.

3. The method according to claim 1, wherein the storing the storing the first measurement data samples and storing the second measurement data samples comprise successively storing the first measurement data samples and the second measurement data samples as the first measurement data samples are sampled at the first sampling rate and the second measurement data samples are sampled at the second sampling rate.

4. The method according to claim 1, further comprising:
   storing a write location in the FIFO memory at which a next sampled measurement data sample should be stored, by a write pointer; and
   storing a read location in the FIFO memory at which a measurement data sample should be read, by a read pointer.

5. The method according to claim 1, further comprising indicating the status of the FIFO memory by a flag.

6. The method according to claim 5, wherein the flag indicates at least one of:
   the FIFO memory is full;
   the FIFO memory is empty;
   all measurement data samples have been read from the FIFO memory; and
   filling of memory space of the FIFO memory has exceeded a given threshold.

7. The method according to claim 1, further comprising outputting at least one measurement data sample from among the first measurement data samples and the second measurement data samples stored in the FIFO memory and a tag associated with the at least one measurement data sample stored in the FIFO memory to a read-out buffer.

8. A first-in first-out memory (FIFO) arranged to store measurement data samples measured by a plurality of data measurement sensors, in which an oldest measurement data sample is arranged to be read first from the FIFO memory, the FIFO memory comprising:
   first registers configured to store first measurement data samples in the FIFO memory in association with a first tag that identifies the first data measurement sensor; and
   second registers configured to store second measurement data samples in the FIFO memory in association with a second tag that identifies the second measurement samples,
   wherein the FIFO memory is configured to receive the first measurement data sampled from a first measurement sensor of a first type at a first sampling rate the second measurement samples from a second measurement sensor of a second type at a second sampling rate different from the first sampling rate and store the first measurement data samples in the first registers in association with the first tag based on the sampling of the first measurement data samples at the first sampling rate and store the second measurement data samples in the second registers in association with the second tag based on the sampling of the second measurement data samples at the second sampling rate.

9. An electronic circuit comprising:
a controller configured to sample first measurement data samples from a first measurement sensor of a first type at a first sampling rate and second measurement samples from a second measurement sensor of a second type at a second sampling rate different from the first sampling rate; and
a first-in first-out memory (FIFO) arranged to store measurement data samples measured by a plurality of data measurement sensors, in which an oldest measurement data sample is arranged to he read first from the FIFO memory, the FIFO memory comprising:
first registers configured to store the first measurement data samples in the FIFO memory in association with a first tag that identifies the first data measurement sensor; and
second registers configured to store the second measurement data samples in the FIFO memory in association with a second tag that identifies the second data measurement samples,
wherein the controller is configured to store the first measurement data samples in the first registers in association with the first tag based on the sampling of the first measurement data samples at the first sampling rate and store the second measurement data samples in the second registers in association with the second tag based on the sampling of the second measurement data samples at the second sampling rate.

10. The electronic circuit according to claim 9, wherein the controller is further configured to determine that the first measurement data samples are sampled from the first measurement sensor and the second measurement data samples are sampled from the second measurement sensor.

11. The electronic circuit according to claim 9, further comprising:

a read-out buffer connected to the memory; and
a master unit connected to the read-out buffer,
wherein the FIFO memory is arranged to automatically send at least an oldest measurement data sample and an associated tag to the read-out buffer to be read by the master unit, such that each successive measurement data sample arriving in the read-out buffer overwrites a previous measurement data sample in the read-out buffer.

12. The electronic circuit according to claim 11, wherein the FIFO memory is further configured to send memory status information to the read-out buffer.

13. A non-transitory computer-readable recording medium having recorded thereon a computer program product comprising instructions for implementing a method of operating first-in first-out (FIFO) memory arranged to store measurement data samples measured by a plurality of data measurement sensors, in which memory an oldest measurement data sample is arranged to be read first, the method comprising;
sampling first measurement data samples from a first measurement sensor of a first type at a first sampling rate and second measurement samples from a second measurement sensor of a second type at a second sampling rate different from the first sampling rate;
storing the first measurement data samples in the FIFO memory in association with a first tag that identifies the first data measurement sensor based on the sampling of the first measurement data samples at the first sampling rate; and
storing the second measurement data samples in the FIFO memory in association with a second tag that identifies the second data measurement sample based on the sampling of the second measurement data samples at the second sampling rate.

* * * * *